(12) United States Patent
Baba et al.

(10) Patent No.: US 6,186,288 B1
(45) Date of Patent: Feb. 13, 2001

(54) DISC BRAKE

(75) Inventors: Haruhisa Baba, Chiryu; Yuichi Takeo, Toyota; Makoto Ogawa, Anjo, all of (JP)

(73) Assignee: Aisin Seiki Kabushiki Kaisha, Kariya (JP)

( * ) Notice: Under 35 U.S.C. 154(b), the term of this patent shall be extended for 0 days.

(21) Appl. No.: 09/143,092

(22) Filed: Aug. 28, 1998

(30) Foreign Application Priority Data

Aug. 28, 1997 (JP) .................................................. 9-232812

(51) Int. Cl.$^7$ ...................................................... F16D 65/38
(52) U.S. Cl. ...................................... 188/73.36; 188/73.38
(58) Field of Search .............................. 188/73.35, 73.36, 188/73.37, 73.38, 73.31, 73.41, 73.46, 250 E, 250 B

(56) References Cited

U.S. PATENT DOCUMENTS

| | | | | |
|---|---|---|---|---|
| 3,625,314 | * | 12/1971 | Rinker | 188/73.35 |
| 4,044,864 | * | 8/1977 | Karasudani | 188/73.36 |
| 4,408,681 | * | 10/1983 | Oshima | 188/73.38 |
| 5,025,897 | * | 6/1991 | Hirashita et al. | 188/73.38 |
| 5,310,024 | * | 5/1994 | Takagi | 188/73.36 |
| 5,358,079 | * | 10/1994 | Brown | 188/73.38 |
| 5,427,213 | * | 6/1995 | Weiler et al. | 188/250 B |
| 5,494,140 | * | 2/1996 | Weiler et al. | 188/250 B |
| 5,649,610 | * | 7/1997 | Shimazaki et al. | 188/73.38 |
| 5,699,882 | * | 12/1997 | Ikegami et al. | 188/73.38 |
| 5,941,348 | * | 8/1999 | Matsumoto et al. | 188/73.38 |
| 5,957,245 | * | 9/1999 | Anger et al. | 188/250 B |
| 6,003,642 | * | 12/1999 | Mori et al. | 188/73.37 |

FOREIGN PATENT DOCUMENTS

| | | |
|---|---|---|
| 710778 | 5/1996 | (EP) . |
| 732521 | 9/1996 | (EP) . |
| 2132292 | 7/1984 | (GB) . |
| 1-224531 | 9/1989 | (JP) . |

* cited by examiner

*Primary Examiner*—Robert J. Oberleitner
*Assistant Examiner*—Thomas Williams
(74) *Attorney, Agent, or Firm*—Burns, Doane, Swecker & Mathis, LLP

(57) ABSTRACT

A disc brake which can suppress pad vibration includes an outer pad which while contacting the disc rotor is turned such that the side wall of a guide groove in a support arm on the outer peripheral side abuts with the side face of a projecting section on the outer peripheral side of the pad. A pad support is positioned between the guide groove and the projecting section. The pad support includes a supporting portion, an urging portion and a connecting portion. A projection is provided in the region a little to the bottom of the guide groove on the side face of the projecting section on the outer peripheral side.

3 Claims, 5 Drawing Sheets

DISC BRAKE

This application corresponds to and claims priority under 35 U.S.C. § 119 with respect to Japanese Application No. 09(1997)-232812 filed on Aug. 28, 1997, the entire content of which is incorporated herein by reference.

FIELD OF THE INVENTION

The present invention generally relates to vehicle brakes. More particularly, the present invention pertains to a vehicle disc brake.

BACKGROUND OF THE INVENTION

One known type of disc brake used as a vehicle brake includes a disc rotor which rotates together with the wheel of the vehicle, and a mounting having first and second parallel support arms straddling the outer periphery of the disc rotor. Guide grooves are provided in both support arms facing each other and extend in the direction of the axis of the disc rotor. Pads are disposed between both support arms, each having a first and second convex sections. The first convex section is slidably fitted into the guide groove provided in the first support arm and possesses a cross-section in the axial direction of the disc rotor and in the vertical direction that is generally rectangular. The second convex section is slidably fitted into the guide groove provided in the second support arm and possesses a cross-section in the axial direction of the disc rotor and in the vertical direction that is generally rectangular. The pads suppress the rotation of the disc rotor by contacting the rotary plane of the disc rotor with one side face thereof by being urged in the axial direction of the disc rotor, and are rotated in contact with the disc rotor so that either one side wall among the side wall of the guide groove of the support arm on the outer peripheral side of the disc rotor and the side wall thereof on the inner peripheral side of the disc rotor abuts with one side face, facing to the above-mentioned one side wall, among the side face of the convex section on the outer peripheral side of the disc rotor and the side face thereof on the inner peripheral side of the disc rotor. Pad supports are disposed in the guide grooves of the support arms. Each of the pad supports has a supporting portion positioned between one side wall of the guide groove of the support arm and one side face of the convex section, an urging section urging the convex section toward one side wall and a connecting portion positioned between the bottom of the guide groove of the support arm and a facing plane portion of the convex section facing to the bottom and connecting the supporting portion with the urging section. The urging section is positioned between the other side wall among the side wall of the guide groove of the support arm on the outer peripheral side of the disc rotor and the side wall thereof on the inner peripheral side of the disc rotor and the other side face among the side face of the convex section on the outer peripheral side of the disc rotor and the side face thereof on the inner peripheral side of the disc rotor. A pressing member presses the pads toward the disc rotor.

This disc brake suppresses the rotation of the disc rotor by urging the pads in the axial direction of the disc rotor to contact one side face of the pads against the rotary plane of the disc rotor. Further, one side wall abuts with one side face via the supporting portion of the pad support because the pad turns, in contacting with the disc rotor, so that either one side wall among the side wall of the guide groove of the support arm on the outer peripheral side of the disc rotor and the side wall thereof on the inner peripheral side of the disc rotor abuts with one side face, facing to one side wall, among the side face of the convex section on the outer periphery side of the disc rotor and the side wall thereof on the inner peripheral side of the disc rotor. When one side wall abuts with one side face, frictional force is generated at a part where one side wall contacts with one side face and vibration of the pad during braking is damped, thus suppressing brake squeal.

However, when the pad turns as described above while the pad support is tilted within the guide groove such that the part connecting the supporting portion with the connecting portion approaches one side wall and an edge portion of the supporting portion located on the opposite side from the part connected to the connecting portion approaches one side face for example, the supporting portion of the pad support functions as if it interferes with the abutment of one side wall with one side face, thus generating no frictional force between one side wall and one side face. When no frictional force is generated between one side wall and one side face, the vibration of the pad is not damped during braking action, thus inhibiting the suppression of brake squeal.

Further, when the part connecting the supporting portion and the connecting portion abuts with one side wall and on the fulcrum of this abutting point, the edge portion of the supporting portion abuts against one side face and functions as a spring having a power point at this abutting point, in addition to the supporting portion functioning so as to interfere with the abutment of one side wall with one side face between one side wall and one side face, situations may arise where the vibration of the pad is amplified rather than being suppressed.

In light of the foregoing, a need exists for a disc brake that is capable of reliably and effectively suppressing the vibration of the pads.

SUMMARY OF THE INVENTION

In light of the foregoing, a disc brake according to one aspect of the present invention includes a disc rotor which is rotatable with a wheel of a vehicle, a mounting having first and second parallel support arms straddling an outer periphery of the disc rotor, a first guide groove provided in the first support arm and a second guide groove provided in the second support arm, and pads disposed between the first and second support arms. Each pad has a first projecting section which is slidably fitted into the first guide groove provided in the first support arm and possessing a generally rectangular vertical cross-section in the axial direction of the disc rotor. Each pad also has a second projecting section which is slidably fitted into the second guide groove provided in the second support arm and possessing a generally rectangular vertical cross-section in the axial direction of the disc rotor. The pads suppress rotation of the disc rotor through contact with surfaces of the disc rotor by being urged in the axial direction of the disc rotor. The pads are rotated in contacting engagement with the disc rotor so that either the side wall of the guide groove of the support arm on the outer peripheral side of the disc rotor abuts with the side face of the projecting section on the outer peripheral side of the disc rotor or the side wall of the guide groove of the support arm on the inner peripheral side of the disc rotor abuts with the side face of the projecting section on the inner peripheral side of the disc rotor. A pad support is disposed in each of the first and second guide grooves, with each pad support having a supporting portion, an urging portion and a connecting portion connecting the urging portion to the supporting portion. The supporting portion is positioned between one side wall of the respective guide groove of the support arm and one side face of the projecting section, the urging portion is positioned between the side wall of the guide groove different from the one side wall and the side face of the projecting section different from the one side face for urging the projecting section towards the one side wall, and the connecting portion is positioned between the bottom of the guide groove of the support arm and the facing end surface of the projecting section. A projection is formed at a region on one side face of the projecting section that is located closer to the bottom of the guide groove, and a pressing member presses the pads toward the disc rotor.

According to another aspect of the invention, disc brake includes a mounting having first and second parallel support arms adapted to straddle the outer periphery of a disc rotor which rotates with a wheel of a vehicle, a first guide groove provided in the first support arm and a second guide groove provided in the second support arm. A pad is disposed between the first and second support arms, with the pad having a first projecting section fitted into the first guide groove provided in the first support arm and a second projecting section fitted into the second guide groove provided in the second support arm. A pad support disposed in the first guide groove has a supporting portion, an urging portion and a connecting portion connecting the urging portion to the supporting portion. The supporting portion is positioned between one side wall of the first guide groove and one side face of the first projecting section, the urging portion is positioned between the other side wall of the guide groove and the other side face of the first projecting section for urging the first projecting section towards the one side wall, and the connecting portion is positioned between the bottom wall of the guide groove and the end surface of the first projecting section. A projection is formed on one of the side faces of the first projecting section, and a pressing member presses the pads towards one another.

Another aspect of the present invention involves a disc brake that includes a mounting having first and second parallel support arms adapted to straddle the outer periphery of a disc rotor which rotates with a wheel of a vehicle, a first guide groove provided in the first support arm and a second guide groove provided in the second support arm. A pad is disposed between the first and second support arms, with the pad having a first projecting section fitted into the first guide groove provided in the first support arm and a second projecting section fitted into the second guide groove provided in the second support arm. A pad support disposed in the first guide groove has a supporting portion, an urging portion and a connecting portion connecting the urging portion to the supporting portion. The supporting portion is positioned between one side wall of the first guide groove and one side face of the first projecting section, the urging portion is positioned between the other side wall of the guide groove and the other side face of the first projecting section for urging the first projecting section towards the one side wall, and the connecting portion is positioned between the bottom wall of the guide groove and the end surface of the first projecting section. A projection is formed on the end face of the first projecting section, and a pressing member presses the pads towards one another.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein.

DETAILED DESCRIPTION OF THE PREFERRED EMBODIMENTS

Figure 1:
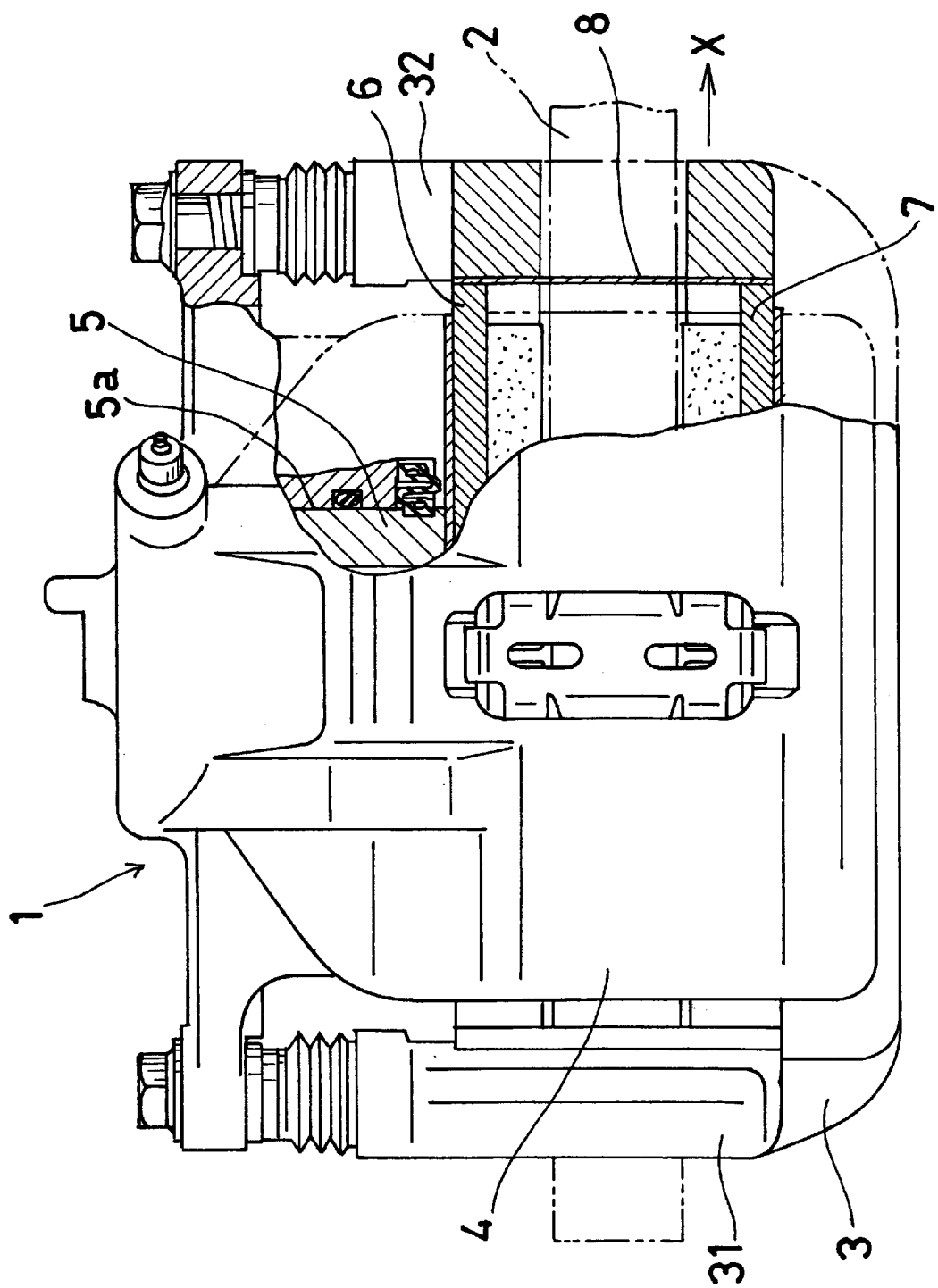
FIG. 1 is a partially cutaway plan view of a disc brake according to a preferred embodiment of the present invention.
Figure 2:
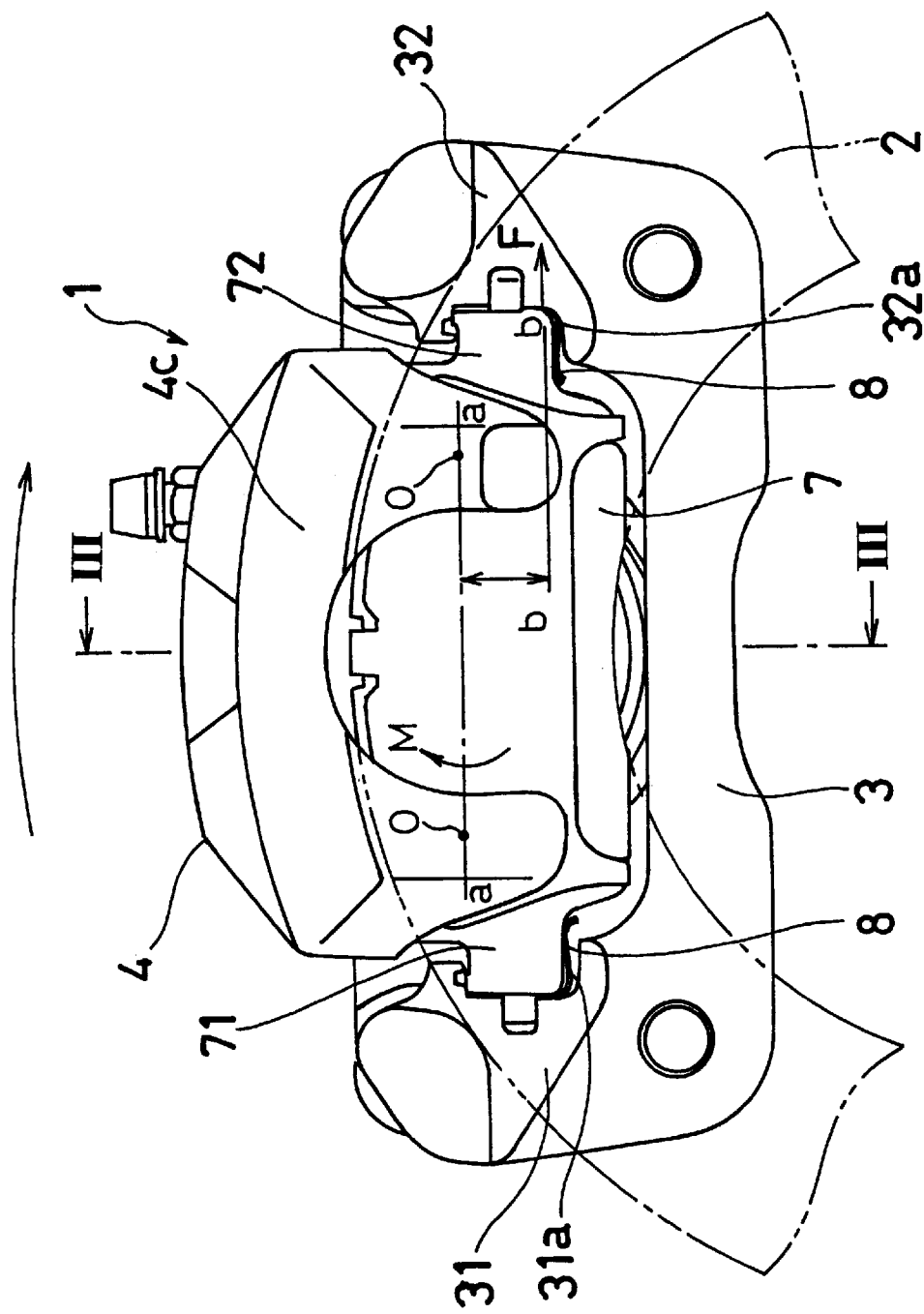
FIG. 2 is a front view of the disc brake shown in FIG. 1.
Figure 3:
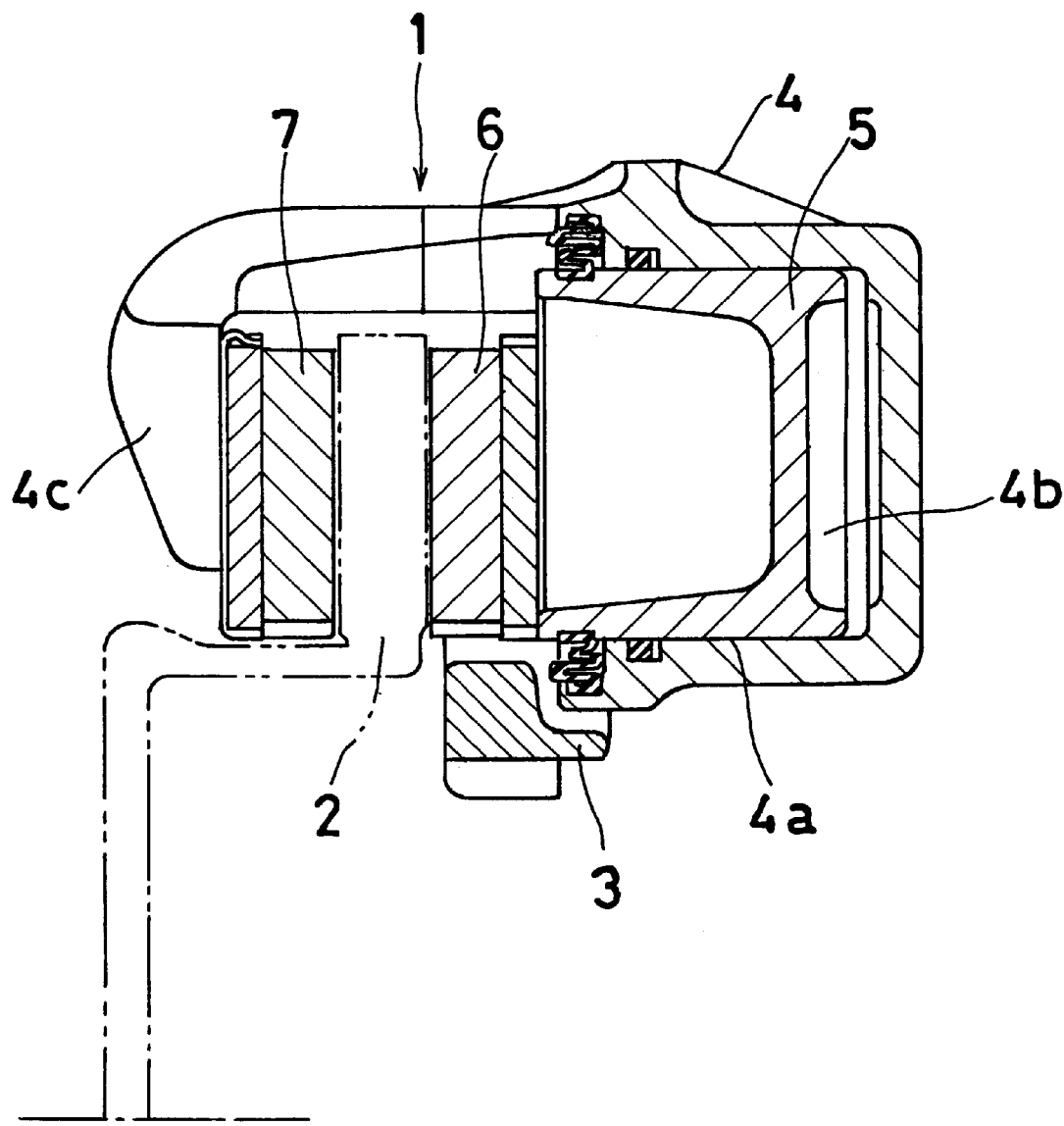
FIG. 3 is a cross-sectional view of the disc brake shown in FIG. 1 taken along the section II—II in FIG. 2.

As shown in FIGS. 1–3, the disc brake 1 according to the present invention includes a disc rotor 2 which rotates together with a vehicle wheel, an inner pad 6 disposed at the inside of the disc rotor 2 (the upper side in FIG. 1), an outer pad 7 disposed at the outside of the disc rotor (the lower side in FIG. 1), a mounting 3, a sliding cylinder 4, a cylindrical piston 5, and pad supports 8.

The mounting 3 is fixed to a non-rotating part of the vehicle at the inside of the disc rotor 2 and is adapted to guide both pads 6, 7 movably in the axial direction of the disc rotor 2 (i.e., in the vertical direction in FIG. 1). The mounting 3 directly receives brake torque applied to both of the pads 6, 7. The sliding cylinder 4 is slidably supported by the mounting 3 in the axial direction of the disc rotor 2 for pressing the outer pad 7 from the outside thereof towards the outer rotary plane of the disc rotor 2. The cylindrical piston 5 is slidably fitted within a cylinder bore 4a of the sliding cylinder 4 and is adapted to press the inner pad 6 from the inside thereof towards the inner rotary plane of the disc rotor 2 by a braking pressure of a brake chamber 4b. The pad supports 8 are disposed within the mounting 3 for suppressing or inhibiting both of the pads 6, 7 from shaking within the mounting 3. The sliding cylinder 4 also presses the outer pad 7 from the outside thereof towards the outer rotary plane of the disc rotor 2 by the braking pressure of the brake pressure chamber 4b.

The mounting 3 has a pair of support arms including a first support arm 31 and a second support arm 32 that are parallel and straddle the outer periphery of the disc rotor 2 in the axial direction of the disc rotor 2. Further, the sliding cylinder 4 is disposed while straddling the outer periphery of the disc rotor 2 between both of the support arms 31, 32.

Figure 5:
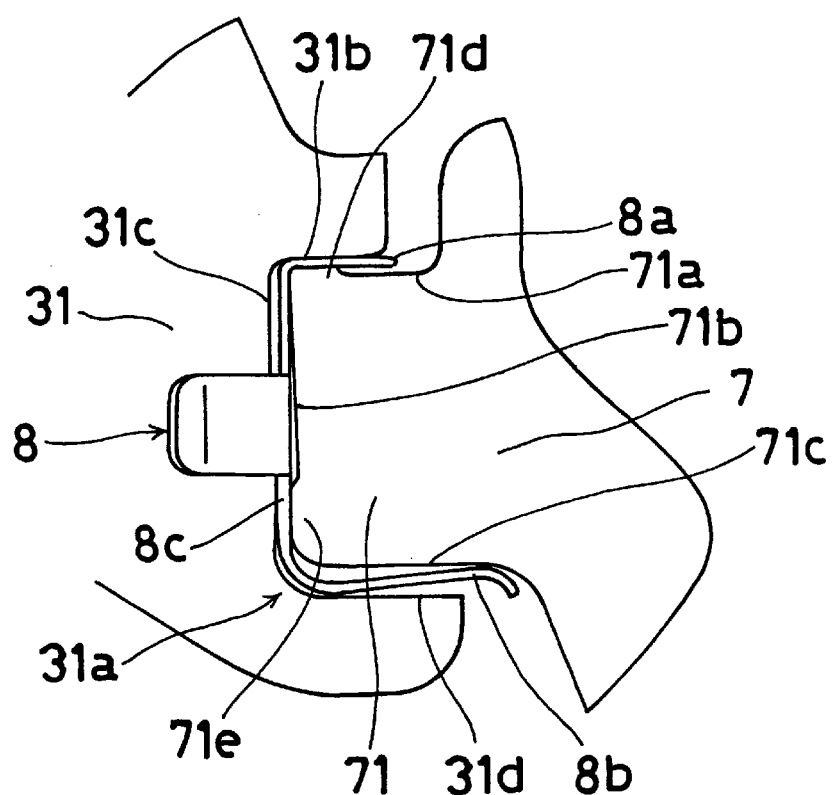
FIG. 5 is a partially enlarged side view of the outer pad and a first support arm used in the disc brake illustrated in FIG. 2.
Figure 6:
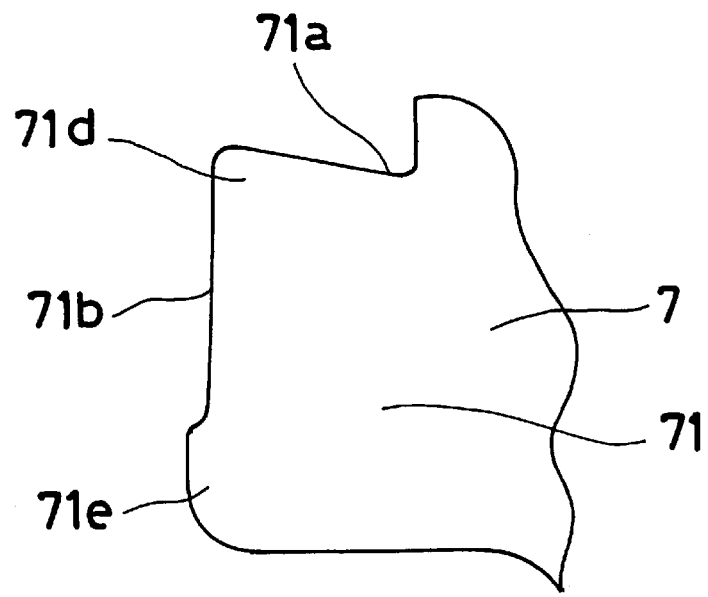
FIG. 6 is an enlarged plan view of a variation on the projecting section forming part of the disc brake shown in FIG. 4.

As best shown in FIGS. 2 and 5, the first and second support arms 31, 32 include surfaces that face one another. A first guide groove 31a and a second guide groove 32a which extend in the axial direction of the disc rotor 2 (i.e., in the direction perpendicular to the plane of FIG. 2) are disposed on these facing surfaces of the first support arm 31 and the second support arm 32 respectively.

The outer pad 7 is disposed between both of the support arms 31, 32 of the mounting 3. The portion of the outer pad 7 that faces the support arm 31 includes a first projecting section 71 that is slidably fitted into the first guide groove 31a. As illustrated in FIGS. 2 and 5, the first projecting section 71 has a generally rectangular shape in vertical cross-section as seen along the axial direction of the disc rotor 2. As also shown in FIG. 2, the part of the outer pad 7 facing the second support arm 32 is provided with a second projecting section 72 that is fitted slidably into the second guide groove 32a. The second projecting section 72 has a generally rectangular vertical cross-section as seen along the axial direction of the disc rotor 2.

The side face 71a of the first projecting section 71 on the outer peripheral side of the disc rotor 2 (upper side in FIGS. 4 and 5) at the region a little towards the bottom 31c of the first guide groove 31a is provided with a first projection 71d. The first projection 71d is thus offset from the center of the side face 71a of the first projecting section 71. This first projection 71d protrudes towards the side wall 31b of the first guide groove 31a on the outer peripheral side of the disc rotor 2. A second projection 71e is provided on the facing plane portion or end face of the first projecting section 71 which faces the bottom 31c of the guide groove 31a of the first support arm 31. The second projection 71e is located at a region a little to the inner peripheral side of the disc rotor 2 (lower side in FIGS. 4 and 5). The second projection 71e is thus not centered on the end face of the first projecting section 71, but rather is offset from the center region of the end face towards one of the side faces of the first projecting section 71. This second projection 71e protrudes towards the bottom 31c of the of the guide groove 31a of the first support arm 31. As can be seen from FIG. 5, for example, the first projection 71d is provided on a face of the first projecting section 71 that is different from and perpendicular to the face of the first projecting section 71 on which the second projection 71e is provided.

The pad support 8 is disposed between the first guide groove 31a and the first projecting section 71. The pad support 8 includes a generally planar supporting portion 8a, an urging portion 8b, and a generally planar plate-like connecting portion 8c. The supporting portion 8a is positioned between the side wall 31b of the first guide groove 31a and the side face 71a of the first projecting section 71. The urging portion 8b is positioned between the side wall 31d of the first guide groove 31a on the inner peripheral side of the disc rotor 2 and the side face 71c of the first projecting section 71 on the inner peripheral side of the disc rotor 2. The plate-like connecting portion 8c is positioned between the bottom 31c of the first guide groove 31a and the facing planar portion 71b of the first projecting section 71. The connecting portion 8c connects the supporting portion 8a with the urging portion 31b. The urging portion 8b urges the first projecting section 71 towards the side wall 31b of the first guide groove 31a on the outer peripheral side of the disc rotor 2 by virtue of the spring action associated with the configuration of the urging portion 8b. Accordingly, the outer pad 7 is suppressed from shaking in the vertical direction in FIG. 2 within the mounting 3.

Figure 4:
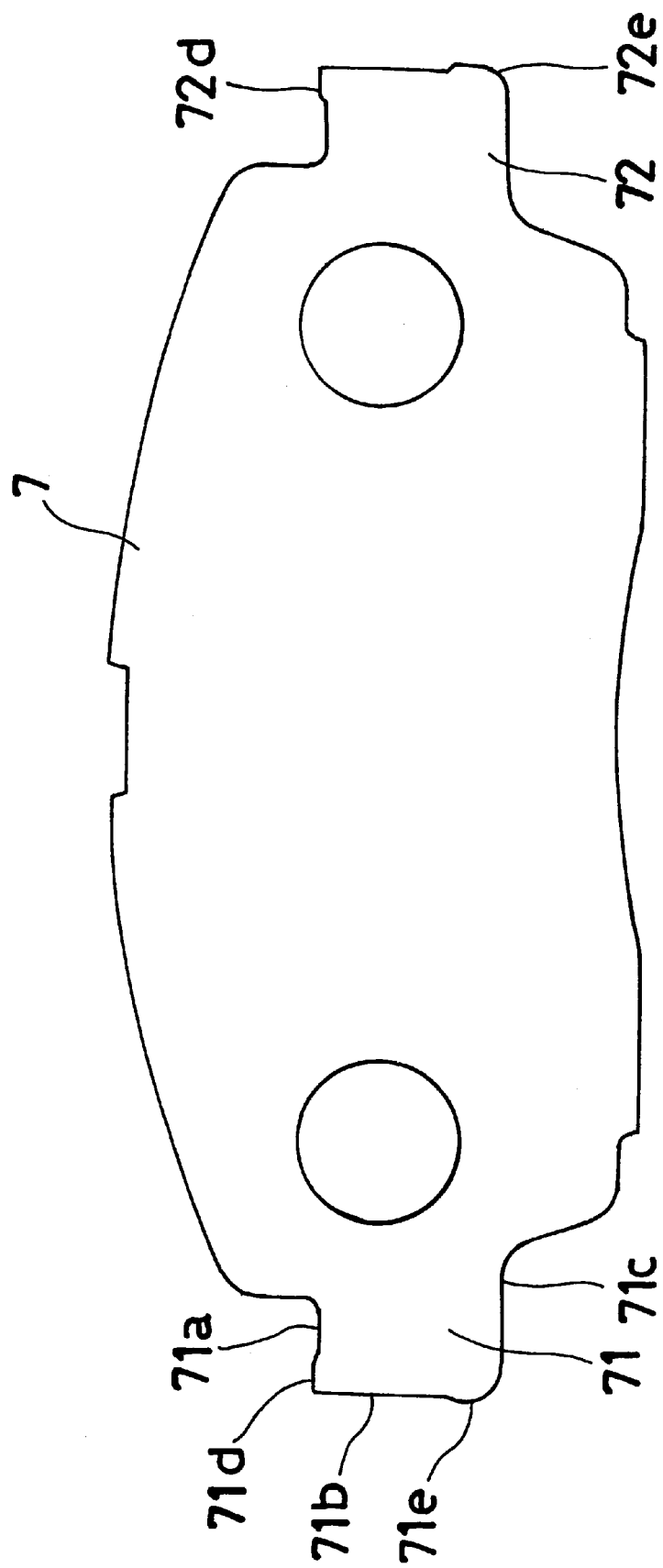
FIG. 4 is an enlarged plan view of an outer pad used in the disc brake shown in FIG. 2.

Like the first projecting section 71, the second projecting section 72 of the outer pad 7 is provided with a first projection 72d and a second projection 72e as shown in FIG. 4. The first and second projections 72d, 72e on the first projecting section 72 are positioned relative to the second guide groove 32a in a manner similar to the way in which the first and second projections 71d, 71e are positioned with respect to the first guide groove 31a. In addition, the pad support 8 configured in the same manner as described above is disposed between the second guide groove 32a and the second projecting section 72 in the same manner as described above in connection with the disposition of the pad support relative to the first guide groove 31a and the first projecting section 71. Further, the inner pad 6 is configured and mounted in the same manner as the outer pad 7.

The arrow X shown in FIGS. 1 and 2 indicates the direction of rotation of the disc rotor 2 when the vehicle is moving in the forward direction.

With the vehicle moving in the forward direction, when a brake pressure is applied to the brake chamber 4b composed of the sliding cylinder 4 and the piston 5 in the disc brake 1 constructed in the manner described above, the piston 5 abuts against the inner side face of the inner pad 6 to press the inner pad 6 towards the disc rotor 2 and a claw section 4c of the sliding cylinder 4 abuts against the outer side face of the outer pad 7 to press the outer pad 7 against the disc rotor 2. As both pads 6, 7 are pressed and urged in this manner, the outer side face of the inner pad 6 abuts against the inner rotary plane of the disc rotor 2 and the inner side face of the outer pad 7 abuts against the outer rotary plane of the disc rotor 2, thus applying a force tending to suppress rotation of the disc rotor 2.

As seen with reference to FIG. 2, with the pads 6, 7 abutting the disc rotor 2, the second support arm 32 of the mounting 3 receives a brake torque F that is applied to the outer pad 7 when the outer pad 7 abuts against the disc rotor 2. The part where the second support arm 32 receives the brake torque F is the part where the second projection 72e of the second projecting section 72 of the outer pad 7 at the bottom of the second guide groove 32a abuts via the pad support 8. Here, because a straight line b—b passing through the part of the second support arm 32 at which the brake torque F is received and parallel to a straight line passing through both axes of the both support arms 31, 32 deviates from a dashed line a—a which is parallel with the straight line passing through both axes of both support arms 31 and 32 and passing through the centers of abutment of the outer pad 7 and the claw section 4c, an angular moment M is applied to the outer pad 7 and so the outer pad 7 turns clockwise as seen with reference to FIG. 2.

Then, the first projection 71d of the first projecting section 71 of the outer pad 7 abuts against the side wall 31b of the first guide groove 31a on the outer peripheral side via the supporting portion 8a of the pad support 8. When the first projection 71d abuts against the side wall 31b on the outer peripheral side, a frictional force is generated between the first projection 71d and the side wall 31b on the outer peripheral side. This frictional force damps the vibration of the outer pad 7 and the vibration of the disc rotor 2 in the axial direction, thus suppressing brake squeal. The inner pad 6 also brings about the same effect as that associated with the outer pad 7.

When the brake is actuated with the vehicle moving backward, a force in the inverse direction from the angular moment M is applied to the outer pad 7 and the outer pad 7 thus turns counterclockwise. Then, the first projection 72d of the second projecting section 72 of the outer pad 7 abuts against the side wall of the second guide groove 32a on the outer peripheral side. When the first projection 72d abuts against the side wall on the outer peripheral side, a frictional force is generated between the first projection 72d and the side wall on the outer peripheral side. This frictional force damps the vibration of the outer pad 7 and the vibration of the disc rotor 2 in the axial direction, thus once again suppressing brake squeal. The inner pad 6 also brings about the same effect as the outer pad 7.

When the brake is actuated when the vehicle is moving forward in the state where the pad support 8 between the first projecting section 71 of the outer pad 7 and the first guide groove 31a of the first support arm 31 is tilted such that the edge portion of the supporting portion 8a directed towards the center of the disc rotor 2 (i.e., the right side in FIG. 5) approaches the side face 71a of the first projecting section 71 on the outer peripheral side and such that the part connecting the supporting portion 8a and the connecting portion 8c on the opposite side from the edge portion approaches the side wall 31b of the first guide groove 31a on the outer peripheral side, the supporting portion 8a of the pad support 8 exhibits its spring action when the outer pad 7 is turned as described above and the first projection 71d tries to abut against the side wall 31b of the first guide groove 31a on the outer peripheral side via the supporting portion 8a.

However, because the supporting portion 8a abuts with the first projecting section 71 only through the first projection 71d, and the first projection 71d is located at the region a little to the bottom 31c of the first guide groove 31a, the gap between the part where the first projection 71d abuts with the supporting portion 8a and the side wall 31b on the outer peripheral side, when the outer pad 7 is turned, is rather small as compared to the disc brakes of known construction. Accordingly, because the spring action of the supporting portion 8a may be also minimized, the first projection 71d abuts with the side wall 31b on the outer peripheral side more steadily when the outer pad 7 turns. Then, the frictional force between the first projection 71d and the side wall 31b on the outer peripheral side is able to be generated and the brake squeal is suppressed more steadily. The same effect can be achieved obtained when the vehicle is moving backward and also in the case of the inner pad 6.

As described above, according to the disc brake 1 of the present invention, because the first projection is provided on the side face of the projecting section on the outer peripheral side, the side face of the projecting section on the outer peripheral side abuts with the side wall of the guide groove on the outer peripheral side more steadily when the inner and outer pads 6, 7 are rotated. Then, it is possible to generate a frictional force between the first projection 71d and the side wall 31b on the outer peripheral side, and so the brake squeal can be suppressed more steadily. Accordingly, by virtue of the present invention, the disc brake is well suited to suppressing the vibration of the inner and outer pads 6, 7.

Although the cross-section of the first projection 71d in the axial direction of the disc rotor 2 and in the vertical direction is illustrated as being generally rectangular in the present embodiment described above, the shape thereof is not limited only to this shape. For instance, the first projection 71d can be formed such that the region a little towards the bottom 31c of the first guide groove 31a is tapered toward the side wall 31b of the first guide groove 31a on the outer peripheral side of the disc rotor 2.

Additionally, although the disc brake 1 has been described in the context of a single cylinder type brake in the present embodiment, the present invention is not limited only to such structure. Similar advantages to those described above can be obtained by applying the disc brake to an opposed cylinder type brake.

Although the first guide groove 31a and the second guide groove 32a are described and illustrated as being provided in the first and second support arms 31, 32 respectively, the present invention is not limited only to such structure. For instance, advantages similar to those described above can be realized by utilizing a disc brake in which two each of the first and second guide grooves are created respectively in the first and second support arms.

Moreover, the straight line b-b which is parallel to the straight line which passes through the part of the second support arm 32 which receives the brake torque F and through both axes of the both support arms 31, 32 deviates from the dashed chain line a—a which is parallel to the straight line which passes through both axes of both support arms 31, 32 and passes through the centers of the abutment O and O of the outer pad 7 and the claw section 4c to the inner peripheral side of the disc rotor 2 (i.e., the lower side in FIG. 2). However, the present invention is not limited only to such an arrangement. For example, advantages similar tot hose described above can be obtained by a disc brake in which the straight line b—b which is parallel to the straight line passing through the part of the second support arm 32 which receives the brake torque F and passes through both axes of both support arms 31, 32 deviates from the dashed chain line a—a which is parallel to the straight line passing through both axes of the support arms 31, 32 and passing through the centers of abutment O and O of the outer pad 7 and the claw section 4c to the outer peripheral side of the disc rotor 2 (i.e., the upper side in FIG. 2). In short, the same advantageous effect can be obtained as long as the disc brake has the function of turning the pads.

Although the first projection 71d is located on the side face 71a on the outer peripheral side at the part closest to the bottom 31c of the first guide groove 31, variations on this arrangement are possible. For instance, a similar advantageous result can be obtained by a disc rotor in which the first projection is provided at a part on the side face of the first projecting section on the outer peripheral side that is separated more or less from the bottom of the guide groove.

Further, while the first projection 71d is described and illustrated as being on the side face 71a of the first projecting section 71 on the outer peripheral side in the present embodiment, the present invention is not limited only to this arrangement. It is possible for example to achieve a similar effect by using a disc brake in which a linear member extending in the axial direction of the disc rotor is disposed on the side face of the projecting section on the outer peripheral side as a projection.

Additionally, although the second projection 71e is illustrated and described as being on the facing plane portion 71b of the first projecting section 71, variations on this arrangement are possible. A similar result can be obtained for example by a disc brake in which a linear member extending in the axial direction of the disc rotor is disposed on the facing plane portion of the projecting section as a projection.

As described above, according to the present invention, because one side face of the first projecting section is provided with the projection, one side face of the projecting section abuts against the one side wall of the guide groove more steadily when the pad is turned. A frictional force can thus be generated between the projection and the one side wall so that the brake squeal is able to be suppressed more steadily. Accordingly, the disc brake according to the present invention is able to suppress vibration in the pads. Further the present invention provides a better arrangement by which the pad is turned in abutting with the disc rotor.

The principles, a preferred embodiment and a mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A disc brake, comprising:

a disc rotor which is rotatable with a wheel of a vehicle, said disc rotor having an axis;

a mounting having first and second parallel support arms straddling an outer periphery of said disc rotor;

a first guide groove provided in the first support arm and a second guide groove provided in the second support arm, the guide grooves facing each other and extending in a direction of the axis of said disc rotor;

pads disposed between said first and second support arms, each pad having a first projecting section which is slidably fitted into said first guide groove provided in said first support arm and possessing a generally rectangular vertical cross-section in the axial direction of said disc rotor, each pad also having a second projecting section which is slidably fitted into said second guide groove provided in the second support arm and possessing a generally rectangular vertical cross-section in the axial direction of said disc rotor, said pads suppressing rotation of said disc rotor through contact with surfaces of said disc rotor by being urged in the axial direction of said disc rotor, said pads being rotated in contacting engagement with said disc rotor so that either a side wall of said guide groove of the support arm on an outer peripheral side of said disc rotor abuts with a side face of said projecting section on the outer peripheral side of said disc rotor or a side wall of said guide groove of the support arm on an inner peripheral side of said disc rotor abuts with a side face of said projecting section on an inner peripheral side of said disc rotor;

a pad support disposed in each of said first and second guide grooves, each pad support having a supporting portion, an urging portion and a connecting portion connecting the urging portion to the supporting portion, the supporting portion being positioned between one side wall of the respective guide groove of the support arm and one side face of said projecting section, the urging portion being positioned between a side wall of said guide groove different from said one side wall and the side face of said projecting section different from said one side face and urging said projecting section towards the one side wall, and the connecting portion being positioned between a bottom of said guide groove of said support arm and a facing end surface of said projecting section;

a projection formed at a region on one side face of each projecting section of each pad that is located closer to said bottom of said guide groove so as to abut against the side wall of the guide groove during braking; and a pressing member for pressing said pads toward said disc rotor, at least one region of abutment among regions of abutment of the projecting sections and the bottom of the guide grooves of both support arms deviates from a straight line parallel to a straight line passing through the axes of said support arms and passing through the centers of abutment of the pressing member and the pad, the projection abutting against a portion of the side wall of the guide groove located closer to the bottom of the guide groove via the supporting portion of the pad support by the rotation of the pad during braking.

2. The disc brake according to claim 1, including a projection provided on the end surface of the projecting section.

3. The disc brake according to claim 2, wherein said projection provided on the end surface of the projecting section is offset from a center of said end surface.

* * * * *